United States Patent Office 3,427,702
Patented Feb. 18, 1969

3,427,702
PROCESS FOR THE MANUFACTURING
OF FUEL ELEMENTS
Carlo Mustacchi, Ranco, Othmar Gautsch, Angera, and Hartmut Wahl, Ranco, Italy, assignors to European Atomic Energy Community (Euratom), Brussels, Belgium
No Drawing. Filed Nov. 1, 1965, Ser. No. 506,007
Claims priority, application Great Britain, Feb. 9, 1965, 5,629/65
U.S. Cl. 29—400     4 Claims
Int. Cl. B22f 3/24

ABSTRACT OF THE DISCLOSURE

A process for the manufacture of fuel elements for nuclear reactors, the fuel consisting of a nuclear fuel carbide such as uranium carbide and cladding, in which the carbide is contacted with an oxidizing agent, in either a gaseous or liquid state, after insertion into the cladding to thereby control expansion of the carbide.

---

The nuclear fuel carbide can have the form of carbide pellets or it can be a carbide bar or have any other suitable form and the cladding can be a tube which is closed at both ends, for example consisting of an aluminium-aluminium oxide composition known as SAP (sintered alumina powder) a stainless steel composition or any other suitable material, or the cladding can have any other form, adapted to the form of the fuel.

A difficulty in the manufacture of such fuel elements is, that there are always assembly clearances between the fuel and the cladding. In operation of a nuclear reactor these clearances give rise to substantial local temperature increases in the elements causing excessive fission gas release, which can lead to rupture of the cladding, and also to generate uncontrolled swelling of the fuel itself.

Clearances between fuel and cladding are generally decreased by choosing close dimensional tolerances. This solution entails costly mechanical operations and checks on cladding and fuel materials. A press-fit insertion of cladding and fuel has been proposed but it does not eliminate said close tolerance requirements and a heat-shrink operation of the cladding on the fuel often leads to assymmetrical stresses in the claddings and cracking of the fuel. Collapsing the cladding on the fuel after fabrication of the elements on the other hand can only be used in the case of very thin cladding materials endowed with high elongation to rupture. This is however seldom the case in fuel claddings. Still another proposition is the use of bonding materials between the fuel and the cladding. This solution often introduces the use of materials such as bismuth or lead or other molten metals in the gap with high cross sertions for neutron capture. Liquid materials can migrate in the fuel cracks leaving voids on the surface and generating hot spots. Corrosion and diffusion can be major problems associated with this solution.

According to the invention these difficulties are overcome by contacting the fuel with an oxidizing agent in gaseous or liquid state after insertion of the carbide into the cladding.

The proposed solution is based upon a controlled expansion of the carbide, for example the carbide pellets after insertion into the cladding, whatever the assembly clearance is. This expansion can be closely controlled by surface oxidizing the pellets. This oxidation can be performed by the blowing warm air (dry or wet) or any other suitable oxidizing agent through the assembled element.

In the case of uranium mono- or dicarbide these compounds oxidise under the given circumstances to uranium oxides as $UO_2$ or $U_3O_8$ which have a larger specific volume and therefore lead to a decrease of the clearance.

The local swelling is found to be self-stabilizing in that swelled ridges of fuel which come into contact with the cladding will automatically prevent the flow of the oxidizing agent and therefore stop swelling.

After a suitable period of oxidation the fuel cladding can be closed as usually.

This procedure can be applied not only during fabrication of the fuel elements but also during actual reactor operation in that a suitable oxidizing gas or liquid is previously left inside the fuel element cladding. Portions of the fuel pellets further from the cladding will reach higher operating temperature. Their oxidation will therefore be faster than portions of the pellet closer to the cladding, leading to a self-stabilizing decrease of temperature of the fuel pellet surface.

Series of tests using dry and wet air and dry and wet $CO_2$ and UC showed that fuel-cladding conductances could simply and reproducibly be increased by the aforesaid technique from typical values of 0.1 w./cm.$^2 \times °$ C. to 10 w./cm.$^2 \times °$ C. without unduly stressing the clad tube.

In-pile operation of SAP-clad UC pellets in a Xe atmosphere containing a few percent air, similarly led over an irradiation of a few hundred MWD/T to a decrease of the thermal resistance between fuel and clad of a factor 2 to 4.

The process according to the invention avoids any costly mechanical specification on fuel and clad dimension and leads to an inexpensive way to decrease gas release, danger of cracking the fuel elements etc., by lowering the maximum fuel operating temperature by several hundred degrees in typical cases.

We claim:
1. A process for the manufacture of fuel elements for nuclear reactors comprising the steps of cladding a nuclear fuel in the form of carbide pellets and providing access in said cladding to said fuel, passing a fluid oxidizing agent through the cladded nuclear fuel carbide thereby surface oxidizing the pellets and causing self-stabilizing local swelling bringing said fuel pellets into contact with the cladding to thereby prevent further flow of said oxidizing agent and stopping said swelling, and closing the cladding after a suitable period of oxidation and controlled swelling of said pellets.

2. A process according to claim 1 in which said fuel is a uranium monocarbide fuel in the form of pellets and the cladding consists of an aluminium-aluminium oxide composition, a superficial oxidation of the monocarbide being carried out before the fuel element is closed.

3. A process according to claim 1 in which said oxidizing agent is air.

4. A process according to claim 1 in which, after insertion of the carbide into the cladding, an amount of oxidizing agents is put into the fuel element whereafter said fuel element is closed.

References Cited

UNITED STATES PATENTS

| 2,915,815 | 12/1959 | Bean et al. | 29—473.3 |
| 3,098,022 | 7/1963 | Karnie | 29—473.3 |
| 3,300,848 | 1/1967 | Leitten et al. | 29—420.5 |

THOMAS H. EAGER, Primary Examiner.

U.S. Cl. X.R.

29—420.5, 422, 445